(12) United States Patent
Aue et al.

(10) Patent No.: US 7,711,451 B2
(45) Date of Patent: May 4, 2010

(54) CONTROL DEVICE FOR REFRIGERATION OR AIR CONDITIONING SYSTEMS

(75) Inventors: Peter Aue, Böblingen (DE); Ali R. Nejad, Schorndorf-Weiler (DE); Hans-Jürgen Bersch, Simmerath (DE); Bernd Kowanz, Öhringen (DE)

(73) Assignee: Emerson Electric GmbH & Co., OHG, Waiblingen (DE)

( * ) Notice: Subject to any disclaimer, the term of this patent is extended or adjusted under 35 U.S.C. 154(b) by 165 days.

(21) Appl. No.: 11/569,142

(22) PCT Filed: Apr. 20, 2005

(86) PCT No.: PCT/EP2005/004240

§ 371 (c)(1),
(2), (4) Date: Jul. 28, 2008

(87) PCT Pub. No.: WO2005/116542

PCT Pub. Date: Dec. 8, 2005

(65) Prior Publication Data

US 2008/0282715 A1    Nov. 20, 2008

(30) Foreign Application Priority Data

May 18, 2004   (DE) .................. 10 2004 024 663

(51) Int. Cl.
G05D 23/00 (2006.01)
F25B 29/00 (2006.01)
(52) U.S. Cl. ................... 700/276; 700/278; 700/2; 62/159
(58) Field of Classification Search ................ 700/276, 700/300, 278, 2; 62/159; 236/51; 712/32, 712/34, 36
See application file for complete search history.

(56) References Cited

U.S. PATENT DOCUMENTS

| 5,475,986 | A |   | 12/1995 | Bahel et al. |
| 5,761,479 | A | * | 6/1998 | Huang et al. ................ 710/301 |
| 5,832,294 | A | * | 11/1998 | Reinschmidt ................ 712/32 |
| 6,330,806 | B1 |   | 12/2001 | Beaverson et al. |
| 6,938,177 | B1 | * | 8/2005 | Blemel ........................ 713/500 |
| 2003/0010046 | A1 |   | 1/2003 | Freund et al. |

FOREIGN PATENT DOCUMENTS

DE    3220420 A1    12/1983

OTHER PUBLICATIONS

International Search Report PCT/EP2005/004240 dated Jul. 28, 2005, 4 pages.
Published Application WO 2005/116542 A1 dated Dec. 8, 2005, 21 pages.

* cited by examiner

*Primary Examiner*—Ramesh B Patel
*Assistant Examiner*—Steven R Garland
(74) *Attorney, Agent, or Firm*—Lewis and Roca LLP

(57) ABSTRACT

The invention relates to a control unit for a refrigeration or air conditioning device, comprising a main processor that is situated in a housing and that controls the temperature, fan and/or the defrosting process of a refrigeration or air conditioning device. Contact points for a co-processor, which is separate from the main processor and is suitable for controlling an electronic expansion valve, are located in said housing.

11 Claims, 2 Drawing Sheets

CONTROL DEVICE FOR REFRIGERATION OR AIR CONDITIONING SYSTEMS

CROSS-REFERENCE TO RELATED APPLICATIONS

Figure 1:
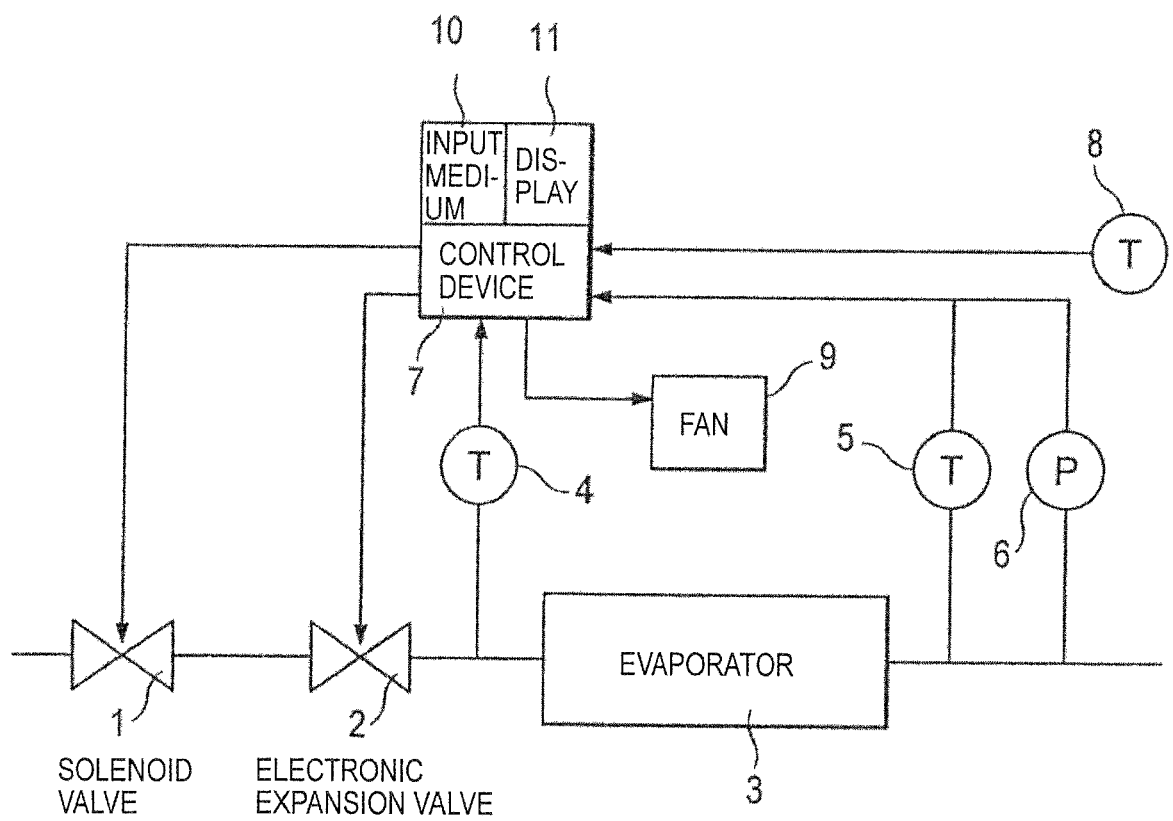

This application claims priority to PCT Patent Application Serial Number PCT/EP2005/004240, filed Apr. 20, 2005, which claims priority to German Patent Application Serial Number 10 2004 024 663.7, filed May 18, 2004, which are hereby incorporated by reference as if set forth herein.

FIELD

The invention relates to a control device for an air conditioning or refrigeration unit comprising a main processor provided inside a housing for the control of the temperature, of the fan and/or of the defrosting procedure of an air conditioning or refrigeration unit in dependence on respectively prevailing input values.

BACKGROUND

The statements in this section merely provide background information related to the present disclosure and may not constitute prior art.

Control devices for air conditioning or refrigeration units are known in the most varied embodiments from the prior art. Simpler air conditioning or refrigeration units are equipped with control devices based on mechanical principles, whereas higher quality air conditioning or refrigeration units frequently have electronic control devices of the aforesaid type in which a microprocessor controls all the control or regulation procedures. In addition to the desired room or cooling temperature, where required, the switching on and off or the speed of a fan as well as the triggering and ending of a defrosting procedure and possibly also even further procedures can be controlled by the microprocessor.

Air conditioning and refrigeration units furthermore generally have a coolant circuit in which a compressor, a liquefier, an expansion valve and an evaporator are arranged sequentially in the direction of flow. For a reliable and efficient operation of the coolant circuit, it must be ensured by a suitable control of the expansion valve that the coolant reaching the evaporator is evaporated as completely as possible in the evaporator. To realize this goal as best as possible, electronically controlled expansion valves are increasingly being used which have some advantages with respect to the precision of the control to be achieved over the otherwise customary thermal expansion valves.

Electronically controlled expansion valves are, however, comparatively expensive and furthermore, unlike thermal expansion valves, require their own electronic overheating control for the processing of sensor signals coming from the coolant circuit. In addition to the additional cost effort for an electronically controlled expansion valve, there is therefore additional effort to be made cost with respect to the electronic overheating control and with respect to the sensor system separately required for the overheating control.

SUMMARY

An object of the invention consequently consists of further developing a control device of the initially named kind such that the use of electronically controlled expansion valves becomes possible with reduced effort and/or expense.

This object is satisfied in that contact points for a coprocessor separate from the main processor are provided inside the initially mentioned housing, with respective input and/or output signals of the coprocessor being associated with said contact points, with at least one contact point being provided for coprocessor input signals made available by temperature sensors and/or pressure sensors of a coolant circuit and one contact point being provided for a coprocessor output signal for the control of an electronic expansion signal provided in the coolant circuit.

It has been recognized within the framework of the invention that the prejudice existed in professional circles since the availability of electronically controlled expansion valves that the actual control or regulation circuit of air conditioning or refrigeration units, by means of which, for example, the temperature to be reached can be adjusted, has to be strictly separated from that control or regulation circuit which controls the electronic expansion valve, in particular its stepper motor. Although the two named control or regulation circuits have always been accommodated in separate housings, and indeed without them cooperating in any way, it was recognized in accordance with the invention that the two named control or regulation circuits can be arranged jointly within a single housing, with not only savings in the housing resulting in this manner, but also synergies in the operation of the two processors which are responsible for the two named regulations or controls.

A particular advantage of the invention can be seen in that the coprocessor responsible for the regulation or control of the electronic expansion valve does not necessarily already have to be present in the control device on the sale of the control device in accordance with the invention. A retrofitting of the coprocessor is rather also possible only at a later point in time due to the contact points provided in accordance with the invention. If, accordingly, on the use of a control device in accordance with the invention, an air conditioning or refrigeration unit is first sold with a thermal expansion valve and subsequently a conversion to an electronically controlled expansion valve should take place, this is possible without any great effort in accordance with the invention, since only the sensor system required for this purpose has to be retrofitted and the coprocessor has to be inserted at its position in the housing provided for this purpose. The described retrofitting possibility represents a very substantial economic advantage since it is to be anticipated that thermal expansion valves will be replaced to a large extent by electronically controlled expansion valves in the future.

The coprocessor which can be used in accordance with the invention must be in a position to make use of a stored algorithm for the overheating regulation and for the control of the electronic expansion valve. An algorithm of this type can either be stored in a memory which can be retrofitted together with the coprocessor, or it can also be located in the coprocessor itself. If the memory component for the said algorithm can be retrofitted separately from the coprocessor, the advantage results that the control device in accordance with the invention can be provided with any updates of the named algorithm available without problem at any time.

In addition to the overheating control and the control of the electronic expansion valve, the coprocessor, which is retrofittable in accordance with the invention, can also be responsible for the control of the suction pressure and/or of the liquefying pressure, with it in turn having to make use of suitable algorithms for this.

The contact points for the coprocessor in accordance with the invention can be made, for example, as solders stations or as slots so that a subsequent contacting of the coprocessor becomes possible without any great effort.

The control device in accordance with the invention is preferably used at the location of the evaporator which is located in the respective coolant circuit. It is thus possible to arrange the control device in accordance with the invention inside a freezer together with the evaporator, for example.

The main processor and the coprocessor can be provided on a common main board which is arranged inside the common housing. It is sufficient in this case for only one single electronic board, namely the said main board, to be used on which then not only the main processor is located, but also the contact points for the coprocessor. Alternatively, however, it would also be possible to provide a separate board, separated from the main processor, for the coprocessor.

It is advantageous for the coprocessor to be made as an integrated hybrid circuit to be connected directly to the contact points of the main board or as a chip. The coprocessor can still be arranged on a small board which can in turn be coupled with the main board via the contact points of the main board. Memory components can then also be accommodated on the named small board, for example, and the algorithms required for the coprocessor are stored in them.

The contact points of the main processor and of the coprocessor are preferably connected to one another via data lines so that communication is possible between the main processor and the coprocessor.

This then makes it possible, for example, for the coprocessor to be configurable via the main processor, with in particular cold circuit parameters such as overheating, suction pressure limitation and coolant type being able to be pre-set by the main processor. In this manner, the whole process taking place in the coolant circuit can ultimately be supervised, monitored and controlled via the main processor.

Information can also be delivered from the coprocessor to the main processor via the said data lines between the main processor and the coprocessor. The main processor can thus, for example, be informed via sensor data which are available to the coprocessor or the degree of opening of the electronic expansion valve can be reported to the main processor.

It is furthermore advantageous for the main processor and the coprocessor to have a common input medium associated with them via which programs which run both in the main processor and in the coprocessor can be influenced. A further saving thereby results since separate input media do not have to be provided for the coprocessor as with apparatus known from the prior art.

A further saving possibility is realized when a common data interface is associated with the main processor and the coprocessor which is accessible from the outside of the housing and via which programs which run in the main processor and in the coprocessor can be influenced. In this variant in accordance with the invention, program updates for both the main processor and the coprocessor can, for example, be loaded together via a uniform data interface without having to intervene into the hardware of the control device in accordance with the invention.

With respect to the costs associated with the realization of the solution in accordance with the invention, it is finally also of advantage for a common display medium to be associated with the main processor and the coprocessor, with output signals of both the main processor and the coprocessor being able to be displayed via it. This presentation can take place visually or acoustically, for example, and can relate to the opening state of the expansion valve, to the temperature set, to the operating state (ON/OFF; normal operation or defrosting operation) or to alarm conditions.

Further preferred embodiments of the invention are set forth in the dependent claims.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
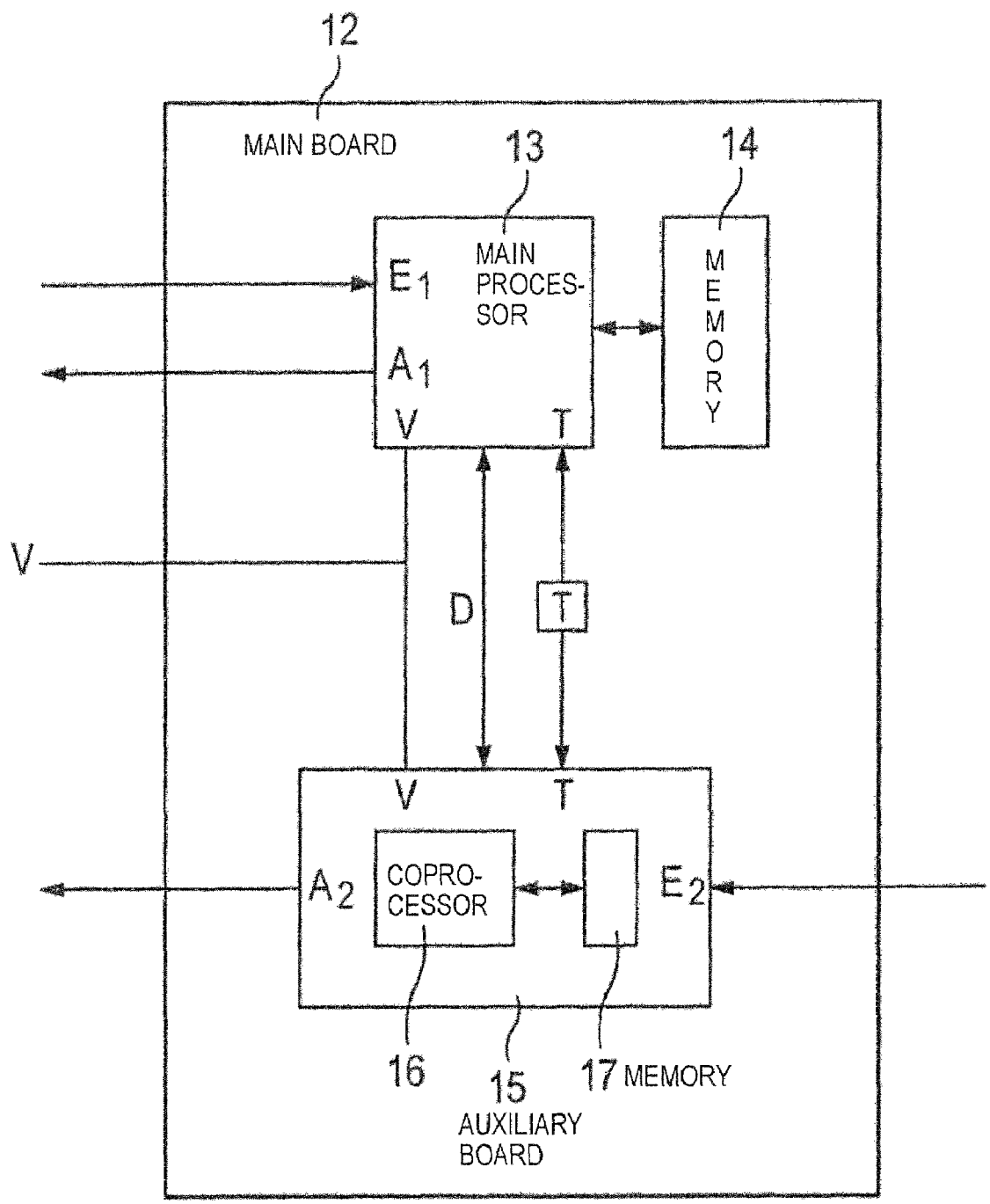

FIG. 1 is a block diagram of the components cooperating with one another in accordance with the invention; and FIG. 2 is a schematic view of a main board with a main processor and a coprocessor.

DETAILED DESCRIPTION

The following description is merely exemplary in nature and is not intended to limit the present disclosure, application, or uses. It should be understood that throughout the drawings, corresponding reference numerals indicate like or corresponding parts and features.

A solenoid valve 1, an electronic expansion valve 2 and an evaporator 3 are arranged sequentially in the direction of flow of the coolant within a coolant circuit shown only regionally in FIG. 1. Within the framework of the normal coolant circuit, which is present on a cooling or air conditioning effect of the evaporator 3, the coolant therefore first flows in liquid form through the solenoid valve 1 and subsequently through the electronic expansion valve 2, whereupon it is evaporated in the evaporator 3.

All the components shown in FIG. 1 can be arranged spatially relatively close to one another, for example inside a freezer. Alternatively, however, it is also possible with respect to the solenoid valve 1, for example, to provide it remote from a freezer, e.g. in a control room.

A temperature sensor 4 is connected upstream of the evaporator 3 in the direction of flow and a further temperature sensor 5 is connected downstream. A pressure sensor 6, which can be provided alternatively to the temperature sensor 4, is furthermore arranged parallel to the temperature sensor 5. The sensors 4, 5 and/or 6 deliver temperature signals and/or pressure signals to a control device 7 in accordance with the invention which inter alia regulates the respective degree of opening of the electronic expansion valve 2 in the normal operation of the arrangement shown. The electronic expansion valve 2 is regulated in a usual manner such that an evaporation of the coolant supplied to the evaporator 3 takes place as completely as possible within the evaporator 3.

The solenoid valve 1 likewise loaded by the control device 7 can be used to interrupt the coolant circuit, for example for the purpose of a defrosting procedure, and/or to regulate the throughflow of the coolant in dependence on the respectively desired cooling temperature.

A room temperature sensor 8 is furthermore provided which reports the respectively current room temperature to the control device 7 in accordance with the invention.

Finally, a fan 9 is also provided in the region of the evaporator 3 and is acted on by control signals from the control device 7.

The control device 7 is connected to an input medium 10 and to a display 11, with commands being able to be communicated to the control display 7 via the input medium 10 and the display 11 being designed for the display of information which is made available by the control device 7.

On the operation of the apparatus in accordance with FIG. 1, the control device 7 controls the solenoid 1 and the fan 9 in dependence on commands input via the input medium 10 and on signals delivered by the room temperature sensor 8 such that the respectively designed operating mode is adopted. The control device 7 furthermore controls the degree of opening of the electronic expansion valve 2 in dependence on signals which are delivered by the sensors 4, 5 and/or 6.

The control device 7 is thus responsible both for the control of the cooling temperature to be reached, of the required fan power and, optionally, of a defrosting procedure as well as for the control of the expansion valve 2. The control device 7 can be made with a main processor and a coprocessor as was already explained above.

FIG. 2 shows a main board 12 such as can be provided inside a control device 7 in accordance with FIG. 1. The main board 12 has a main processor 13 which accesses a memory 14 in which algorithms and programs for the main processor 13 are stored.

The main processor 13 receives signals, for example signals from a room temperature sensor 8 or an input medium 10 in accordance with FIG. 1, via the at least one port $E_1$. The main processor 13 furthermore has at least one port $A_1$ via which signals can be output, for example signals for the control of a solenoid valve 1 or of a fan 9 in accordance with FIG. 1.

Furthermore an auxiliary board 15, on which a coprocessor 16 and a memory 17 associated with the coprocessor 16 are arranged, is soldered to the main board 12. Algorithms or programs for the coprocessor 16 are in turn stored in the memory 17.

Signals generated by the coprocessor 16 can be transmitted via the at least one port $A_2$ of the auxiliary board 15. It can, for example, be a signal for the control of an electronic expansion valve 2 in accordance with FIG. 1.

Signals can be supplied to the main board and to the coprocessor 16 arranged thereon via at least one further port $E_2$, with these, for example, being able to be signals from the temperature sensors 4, 5 and/or from the pressure sensor 6 in accordance with FIG. 1.

Furthermore, signals can be transmitted to a display 11 in accordance with FIG. 1 via the ports $A_1$ and $A_2$ of the main processor and the coprocessor 13, 16. Consequently, the components present on the main board 12 are in a position to supervise control, regulation and display functions which are necessary for the operation of an air conditioning unit or refrigeration unit in accordance with FIG. 1.

Both processors 13, 16 are supplied via a common voltage supply V and are acted on by a common clock signal T so that, in accordance with the invention, no separate voltage supplies and clock generators are required for the main processor 13 and the coprocessor 16.

Finally, there is a technical data connection D between the main processor 13 and the coprocessor 16 via which an exchange of data can take place between the main processor 13 and the coprocessor 16 for the purposes already described above. The coprocessor 16 can in particular be informed by the main processor 13 of when a defrosting procedure is running so that it can move the expansion valve 2 in accordance with FIG. 1 into a static state, in particular into its open state, during such a defrosting procedure.

The description is merely exemplary in nature and, thus, variations that do not depart from the gist of the present disclosure are intended to be within the scope of the invention. Such variations are not to be regarded as a departure from the spirit and scope of the present disclosure.

REFERENCE NUMERAL LIST 1 solenoid valve
2 electronic expansion valve
3 evaporator
4 temperature sensor
5 temperature sensor
6 pressure sensor
7 control device
8 room temperature sensor
9 fan
10 input medium
11 display
12 main board
13 main processor
14 memory
15 auxiliary board
16 coprocessor
17 memory

The invention claimed is:

1. A control system for an air conditioning or refrigeration unit, comprising:
    a control device housing;
    a main processor provided inside the control device housing controlling at least one of a temperature, a fan, and a defrosting procedure of the air conditioning or refrigeration unit in dependence on respectively prevailing input values, and
    contact points provided inside the control device housing for a coprocessor separate from the main processor, the contact points being associated with respective coprocessor input and output signals, with at least one contact point being provided for coprocessor input from at least one of temperature sensors and pressure sensors of a coolant circuit and one contact point being provided for a coprocessor output connected to an electronic expansion valve provided in the coolant circuit.

2. A control system in accordance with claim 1, wherein the main processor and the contact points for the coprocessor are provided on a common main board which is arranged inside the control device housing.

3. A control system in accordance with claim 1, wherein contact points for the coprocessor are connected to the main processor via data lines.

4. A control system for an air conditioning or refrigeration unit, comprising:
    a control device housing;
    a main processor provided inside the control device housing controlling of at least one of a temperature, a fan and a defrosting procedure of an air conditioning or refrigeration unit in dependence on respectively prevailing input values,
    contact points provided inside the control device housing for a coprocessor separate from the main processor, the contact points being associated with respective coprocessor input and output, with at least one contact point being provided for coprocessor input signals made available from at least one of temperature sensors and pressure sensors of a coolant circuit and one contact point being provided for a coprocessor output signal controlling an electronic expansion valve provided in the coolant circuit; and
    a coprocessor coupled to the contact points.

5. A control system in accordance with claim 4, wherein the coprocessor is configurable via the main processor, with in particular coolant circuit parameters including at least one of overheating, suction pressure limitation and coolant type being preset by the main processor.

6. A control system in accordance with claim 4, wherein a common input medium is associated with the main processor and the coprocessor and programs which run both in the main processor and the coprocessor can be influenced by the common input medium.

7. A control system in accordance with claim 4, wherein a common data interface is associated with the main processor and the coprocessor which interface is accessible from outside of the housing and via which programs which run both in the main processor and the coprocessor can be influenced.

8. A control system in accordance with claim 4, wherein a common display medium is associated with the main processor and the coprocessor via which output signals of both the main processor and the coprocessor can be displayed.

9. A control system in accordance with claim 4, wherein the main processor and the contact points for the coprocessor are provided on a common main board which is arranged inside the control device housing.

10. A control system in accordance with claim 9, wherein the coprocessor is made as an integrated hybrid circuit or as a chip to be connected directly to the contact points of the common main board.

11. A control system in accordance with claim 9, wherein the coprocessor is arranged on a small board which is coupled to the main board via the contact points of the common main board.

* * * * *